US012759022B2

(12) United States Patent
Guo et al.

(10) Patent No.: US 12,759,022 B2
(45) Date of Patent: Oct. 13, 2026

(54) METHOD AND SYSTEM FOR CONDUCTING ORE PRESORTING BASED ON HIERARCHICAL ARRAYED INTELLIGENT SORTING

(71) Applicant: HUZHOU HONEST INTELLIGENT TECHNOLOGY CO., LTD, Huzhou (CN)

(72) Inventors: Jin Guo, Beijing (CN); Xiaolei Tong, Beijing (CN)

(73) Assignee: HUZHOU HONEST INTELLIGENT TECHNOLOGY CO., LTD, Huzhou (CN)

(*) Notice: Subject to any disclaimer, the term of this patent is extended or adjusted under 35 U.S.C. 154(b) by 35 days.

(21) Appl. No.: 18/389,660

(22) Filed: Dec. 19, 2023

(65) Prior Publication Data

US 2025/0144672 A1 May 8, 2025

Related U.S. Application Data

(63) Continuation of application No. PCT/CN2022/104611, filed on Jul. 8, 2022.

(30) Foreign Application Priority Data

Jul. 8, 2021 (CN) ......................... 202110774607.5

(51) Int. Cl.

| | |
|---|---|
| ***B02C 23/10*** | (2006.01) |
| ***B07C 5/34*** | (2006.01) |
| ***B07C 5/36*** | (2006.01) |

(52) U.S. Cl.

CPC .............. *B07C 5/361* (2013.01); *B02C 23/10* (2013.01); *B07C 5/3416* (2013.01); *B07C 5/366* (2013.01)

(58) Field of Classification Search

CPC ....... B07C 5/361; B07C 5/3416; B07C 5/366; B07C 5/346; B02C 23/10; B02C 21/00; B02C 23/14

See application file for complete search history.

(56) References Cited

U.S. PATENT DOCUMENTS

| | | | | |
|---|---|---|---|---|
| 8,820,533 B2 * | 9/2014 | Shaw | B07C 5/3427 | 209/567 |
| 8,875,901 B2 * | 11/2014 | Wellwood | B07C 5/34 | 209/552 |

(Continued)

FOREIGN PATENT DOCUMENTS

| | | |
|---|---|---|
| CN | 102921638 A | 2/2013 |
| CN | 108787149 A | 11/2018 |
| CN | 210159985 U | 3/2020 |

*Primary Examiner* — Patrick H Mackey
(74) *Attorney, Agent, or Firm* — JEEN IP LAW, LLC

(57) ABSTRACT

The present application relates to a method and system for conducting ore presorting based on hierarchical arrayed intelligent sorting. The method includes: acquiring parameter information of ores to be processed, and determining, according to the parameter information, the number of intelligent sorting devices and a sorting hierarchy structure of a plurality of intelligent sorting devices for hierarchical arrayed intelligent sorting; determining, according to the sorting hierarchy structure of the plurality of intelligent sorting devices, a granularity hierarchy structure for conducting multi-hierarchy granularity processing on the ores to be processed; associating each sorting hierarchy in the sorting hierarchy structure with a corresponding granularity hierarchy in the granularity hierarchy structure to form a multi-hierarchy ore processing structure including at least two processing hierarchies; and conducting ore presorting on the ores to be processed based on the multi-hierarchy ore processing structure so as to acquire ores that meet a predetermined granularity.

17 Claims, 4 Drawing Sheets

(56) References Cited

U.S. PATENT DOCUMENTS

| | | | | |
|---|---|---|---|---|
| 10,857,568 | B2 * | 12/2020 | Bamber | G01N 33/24 |
| 2004/0066890 | A1 * | 4/2004 | Dalmijn | G01N 23/083<br>378/57 |
| 2013/0201481 | A1 * | 8/2013 | Bamber | B07C 5/344<br>356/402 |
| 2013/0292307 | A1 * | 11/2013 | Bamber | B07C 5/04<br>209/552 |
| 2016/0015203 | A1 * | 1/2016 | Terrell | A47J 36/20<br>426/523 |
| 2024/0132990 | A1 * | 4/2024 | Guo | C22B 1/24 |

* cited by examiner

METHOD AND SYSTEM FOR CONDUCTING ORE PRESORTING BASED ON HIERARCHICAL ARRAYED INTELLIGENT SORTING

CROSS-REFERENCE TO RELATED APPLICATIONS

The application claims priority to Chinese patent application No. 202110774607.5, filed on Jul. 8, 2021, the entire contents of which are incorporated herein by reference.

TECHNICAL FIELD

The present disclosure belongs to the technical field of ore sorting, and particularly relates to a method and system for conducting ore presorting based on hierarchical arrayed intelligent sorting.

BACKGROUND

At present, conventional beneficiation methods mainly include forward flotation, forward-reverse flotation, reverse flotation, double reverse flotation, heavy media beneficiation, heavy medium-flotation combined beneficiation, etc. Flotation still predominates in mature beneficiation technologies of phosphate ores. However, phosphate ore flotations have the disadvantages of high energy consumption, high agent consumption and tailings water management, which causes excessively high cost of obtaining phosphate concentrates, and the increasingly prominent problem of being unfriendly to the environment. With significant scientific and technological progress made in various industries, there are a growing number of novel beneficiation techniques, and people also begin to apply X-ray sorting technology.

During the application of X-ray sorting technology, raw ores need to be liberated to a certain fine granularity before sorting. In the case of phosphate ores, generally speaking, the raw ores should at least be crushed to 45 mm or below. The present conventional operation is to first liberate the phosphate ores to a granularity of 10-45 mm by using a crusher, and then conduct sorting by using a photometric sorter to acquire phosphate concentrates. However, following problems exist in the process of crushing the raw ores to the granularity of 45 mm or below; on the one hand, the smaller the particles to be crushed, the greater the energy consumption of the crusher, resulting in more fine ores that cannot be separated and are diluted (due to the brittleness of phosphate ores in the crushing process, a large number of fine ores are easily produced; and along with excessive crushing, the waste also produces a large quantity of fine ores). On the other hand, the smaller the granularity, the smaller the output of the photoelectronic sorter, the greater the investment cost, resulting in greater site restrictions and more energy consumption, which is not conducive to energy saving and emission reduction.

SUMMARY

To solve the problems in the prior art, the present disclosure provides a method for conducting phosphate ore presorting based on arrayed intelligent sorting. The ore presorting process of the present disclosure, such as phosphate ore presorting, is generally applicable to the beneficiation process, especially to the situation where a large quantity of ores need to be sorted.

According to one aspect of the present disclosure, the present disclosure provides a method for conducting ore presorting based on hierarchical arrayed intelligent sorting, the method including:

- acquiring parameter information of ores to be processed, and determining, according to the parameter information, the number of intelligent sorting devices and a sorting hierarchy structure of a plurality of intelligent sorting devices for hierarchical arrayed intelligent sorting, where the sorting hierarchy structure includes at least two sorting hierarchies, and each of the sorting hierarchies includes at least one intelligent sorting device;
- determining, according to the sorting hierarchy structure of the plurality of intelligent sorting devices, a granularity hierarchy structure for conducting multi-hierarchy granularity processing on the ores to be processed, where the granularity hierarchy structure includes at least two granularity hierarchies;
- associating each sorting hierarchy in the sorting hierarchy structure with a corresponding granularity hierarchy in the granularity hierarchy structure to form a multi-hierarchy ore processing structure including at least two processing hierarchies; and conducting ore presorting on the ores to be processed based on the multi-hierarchy ore processing structure so as to acquire ores that meet a predetermined granularity.

The determining, according to the parameter information, the number of intelligent sorting devices and a sorting hierarchy structure of a plurality of intelligent sorting devices for hierarchical arrayed intelligent sorting includes:

- acquiring a configuration file associated with ore presorting, and determining a throughput of ore presorting according to the configuration file;
- analyzing the parameter information to determine an initial waste ratio, an initial concentrate ratio and an initial average granularity of the ores to be processed; and
- determining, based on the throughput, the number of intelligent sorting devices, and determining, based on the initial waste ratio, the initial concentrate ratio and the initial average granularity of the ores to be processed, the sorting hierarchy structure of a plurality of intelligent sorting devices for hierarchical arrayed intelligent sorting.

The determining, based on the throughput, the number of intelligent sorting devices includes:

- determining an ore sorting amount per unit time for each intelligent sorting device; and
- determining, based on the ore sorting amount per unit time for each intelligent sorting device and the throughput, the number of intelligent sorting devices.

The determining, based on the initial waste ratio, the initial concentrate ratio and the initial average granularity of the ores to be processed, the sorting hierarchy structure of a plurality of intelligent sorting devices for hierarchical arrayed intelligent sorting includes:

- when the initial waste ratio of the ores to be processed is greater than or equal to a waste ratio threshold, the initial concentrate ratio is greater than or equal to a concentrate ratio threshold, or the initial average granularity is greater than or equal to an initial granularity threshold, determining the sorting hierarchy structure of a plurality of intelligent sorting devices for hierarchical arrayed intelligent sorting as follows: the number of intelligent sorting devices decreases gradually from a large granularity sorting grade to a small granularity sorting grade; and when the initial waste ratio of the ores to be processed is less than a waste ratio threshold, the initial concentrate ratio is less than a concentrate ratio threshold, or the initial average granularity is less than an initial granularity threshold, determining the sorting hierarchy structure of a plurality of intelligent sorting devices for hierarchical arrayed intelligent sorting as follows: at least one target sorting hierarchy is selected from a plurality of sorting hierarchies, and at least two intelligent sorting devices are parallelly deployed at each target sorting hierarchy.

The intelligent sorting device is capable of feeding ores of a predetermined granularity to a high speed belt of a conveying sub-device by using a feeding sub-device;

after conveying the ores of a predetermined granularity for a predetermined distance, the high speed belt of the conveying sub-device enters a steady state, and the ores of a predetermined granularity are conveyed to a sensing sub-device;

when the ores of a predetermined granularity pass directly below a radiation source of the sensing sub-device under the conveying of the belt, the X-ray source irradiates the ores of a predetermined granularity using X-rays excited by high voltage, and X-rays penetrating the ores of a predetermined granularity are attenuated to different degrees depending on different contents of measured elements;

a detector of the sensing sub-device located under the belt collects attenuation data information, converts the attenuation data information into a photoelectric digital signal, and transmits the photoelectric digital signal to an intelligent recognition sub-device of an intelligent recognition system;

the intelligent recognition sub-device generates an image to be recognized based on the photoelectric digital signal, conducts content recognition on the image to be recognized to determine ore parameters of the ores of a predetermined granularity, determines current sorting parameters based on a current grade threshold, compares the ore parameters with the current sorting parameters, marks the ores of a predetermined granularity as waste, concentrates or middlings based on a comparison result, and transmits location information of the ores marked as waste, concentrates or middlings to a blowing control unit of a separation sub-device; and when the ores of a predetermined granularity reach a predetermined position under the belt conveying of the conveying sub-device, a gas exhaust gun of the separation sub-device is controlled by the blowing control unit to blow the ores marked as waste, concentrates or middlings ore via a nozzle of the gas exhaust gun, so as to sort the waste, concentrates and middlings, and thus realize the sorting of the ores of a predetermined granularity.

Each granularity hierarchy includes: crushing processing and sieving processing, and according to a processing order from ores of a maximum granularity to ores of a minimum granularity during multi-hierarchy granularity processing, the granularity of ores acquired at each of the plurality of granularity hierarchies decreases in turn.

Each granularity hierarchy includes:

conducting crushing processing on input ores, and conducting sieving processing on ores acquired after crushing processing;

transferring ores capable of passing sieving processing to a connected intelligent sorting device or to the next granularity hierarchy; and continuing to conduct crushing processing on ores that fail to pass sieving processing until the ores are capable of passing sieving processing.

The sorting hierarchy structure of a plurality of intelligent sorting devices for hierarchical arrayed intelligent sorting includes a first sorting hierarchy, a second sorting hierarchy and a third sorting hierarchy; and the granularity hierarchy structure includes a first granularity hierarchy, a second granularity hierarchy and a third granularity hierarchy.

The method further includes: cyclically conducting primary crushing and primary sieving on the ores to be processed by using crushing processing of the first granularity hierarchy to acquire ores within a first crushing granularity range and ores within a second crushing granularity range;

conducting sorting on the ores within the first crushing granularity range by using each intelligent sorting device in the first sorting hierarchy to acquire waste, primary concentrates and primary middlings;

cyclically conducting secondary crushing and secondary sieving on the primary middlings and the ores within the second crushing granularity range by using crushing processing of the second granularity hierarchy to acquire ores within a third crushing granularity range and ores within a fourth crushing granularity range;

conducting sorting on the ores within the third crushing granularity range by using each intelligent sorting device in the second sorting hierarchy to acquire waste, secondary concentrates and secondary middlings;

cyclically conducting third crushing and third sieving on the secondary middlings by using crushing processing of the third granularity hierarchy to acquire ores within a fourth crushing granularity range and ores within a fifth crushing granularity range; and conducting sorting on the ores within the fifth crushing granularity range by using each intelligent sorting device in the third sorting hierarchy to acquire waste and third concentrates.

The second sorting hierarchy and/or the third sorting hierarchy include/includes a plurality of intelligent sorting devices connected in parallel.

The first crushing granularity range is a granularity range less than or equal to a first granularity and greater than or equal to a second granularity;

the second crushing granularity range is a granularity range less than the second granularity and greater than 0;

the third crushing granularity range is a granularity range less than the second granularity and greater than or equal to a third granularity;

the fourth crushing granularity range is a granularity range less than the third granularity and greater than 0; and the fifth crushing granularity range is a granularity range less than the fourth granularity and greater than or equal to the third granularity;

where the first granularity is greater than the second granularity, the second granularity is greater than the third granularity, and the fourth granularity is greater than the third granularity.

Each processing hierarchy includes a granularity hierarchy and a sorting hierarchy.

After the determining, according to the parameter information, the number of intelligent sorting devices and a sorting hierarchy structure of a plurality of intelligent sorting devices for hierarchical arrayed intelligent sorting, the method further includes:

configuring each of the intelligent sorting devices, wherein a plurality of intelligent sorting devices in the same sorting hierarchy are configured to sort ores within the same crushing granularity range, and intelligent sorting devices in different sorting hierarchies are configured to sort ores within different crushing granularity ranges.

The configuring each of the intelligent sorting devices includes;

determining a current sorting hierarchy of an intelligent sorting device to be configured;

determining a current crushing granularity range corresponding to the current sorting hierarchy;

determining, according to the current crushing granularity range, a selected spectral band of X-rays; and setting a spectral band of a radiation source of the intelligent sorting device to be configured as the selected spectral band.

The configuring each of the intelligent sorting devices includes:

determining a current sorting hierarchy of an intelligent sorting device to be configured;

determining a current crushing granularity range corresponding to the current sorting hierarchy;

determining, according to the current crushing granularity range, a target abrasive resistance of a carrier belt; and determining, according to the target abrasive resistance, the carrier belt with a selected thickness and a selected material for the intelligent sorting device to be configured.

The configuring each of the intelligent sorting devices includes:

determining a current sorting hierarchy of an intelligent sorting device to be configured;

determining a current crushing granularity range corresponding to the current sorting hierarchy;

determining, according to the current crushing granularity range, gas spraying parameters of the intelligent sorting device to be configured; and setting a blowing control unit of the intelligent sorting device to be configured according to the gas spraying parameters, wherein the blowing control unit controls a gas exhaust gun according to the gas spraying parameters, so that each nozzle of the gas exhaust gun is capable of spraying gas of predetermined pressure or strength; and the gas spraying parameters include a caliber size of the nozzle, airflow pressure and/or a time length of a single spray.

The intelligent sorting device is capable of sorting at least two different types of ores by using a gas exhaust gun, where the gas exhaust gun includes a plurality of nozzles, and each of the nozzles is capable of spraying gas at a predetermined time and with a predetermined pressure under the control of a blowing control unit.

The sorting at least two different types of ores by using a gas exhaust gun includes:

controlling, by the blowing control unit, airflow pressure of gas sprayed by the nozzles of the gas exhaust gun so that the sprayed gas exerts different striking forces on each of at least two different types of ores, and thus each type of ores are allowed to enter a corresponding feed bin.

The gas exhaust gun is located on one side of an ore path, and includes at least one row of nozzles, and different striking forces of the airflow sprayed by the nozzles can be acquired by controlling effective calibers of the nozzles, or by controlling the airflow pressure of the gas sprayed by the nozzles.

The gas exhaust gun is located on two sides of an ore path, and the gas exhaust gun on each of the two sides includes at least one row of nozzles so that the gas exhaust gun sprays gas from two different directions to strike at least two different types of ores.

According to another aspect of the present disclosure, the present disclosure provides a system for conducting ore presorting based on hierarchical arrayed intelligent sorting, the system including:

a sorting setting unit, configured to acquire parameter information of ores to be processed, and determine, according to the parameter information, the number of intelligent sorting devices and a sorting hierarchy structure of a plurality of intelligent sorting devices for hierarchical arrayed intelligent sorting, where the sorting hierarchy structure includes at least two sorting hierarchies, and each of the sorting hierarchies includes at least one intelligent sorting device;

a granularity setting unit, configured to determine, according to the sorting hierarchy structure of the plurality of intelligent sorting devices, a granularity hierarchy structure for conducting multi-hierarchy granularity processing on the ores to be processed, where the granularity hierarchy structure includes at least two granularity hierarchies;

an association unit, configured to associate each sorting hierarchy in the sorting hierarchy structure with a corresponding granularity hierarchy in the granularity hierarchy structure to form a multi-hierarchy ore processing structure comprising at least two processing hierarchies; and a processing unit, configured to conduct ore presorting on the ores to be processed based on the multi-hierarchy ore processing structure so as to acquire ores that meet a predetermined granularity.

The determining, by the sorting setting unit, according to the parameter information, the number of intelligent sorting devices and a sorting hierarchy structure of a plurality of intelligent sorting devices for hierarchical arrayed intelligent sorting includes:

acquiring, by the sorting setting unit, a configuration file associated with ore presorting, and determining a throughput of ore presorting according to the configuration file;

analyzing, by the sorting setting unit, the parameter information to determine an initial waste ratio, an initial concentrate ratio and an initial average granularity of the ores to be processed; and determining, by the sorting setting unit, based on the throughput, the number of intelligent sorting devices, and determining, based on the initial waste ratio, the initial concentrate ratio and the initial average granularity of the ores to be processed, the sorting hierarchy structure of a plurality of intelligent sorting devices for hierarchical arrayed intelligent sorting.

The determining, by the sorting setting unit, based on the throughput, the number of intelligent sorting devices includes:

determining, by the sorting setting unit, an ore sorting amount per unit time for each intelligent sorting device; and determining, by the sorting setting unit, based on the ore sorting amount per unit time for each intelligent sorting device and the throughput, the number of intelligent sorting devices.

The determining, by the sorting setting unit, based on the initial waste ratio, the initial concentrate ratio and the initial average granularity of the ores to be processed, the sorting hierarchy structure of a plurality of intelligent sorting devices for hierarchical arrayed intelligent sorting includes:

when the initial waste ratio of the ores to be processed is greater than or equal to a waste ratio threshold, the initial concentrate ratio is greater than or equal to a concentrate ratio threshold, or the initial average granularity is greater than or equal to an initial granularity threshold, determining, by the sorting setting unit, the sorting hierarchy structure of a plurality of intelligent sorting devices for hierarchical arrayed intelligent sorting as follows: the number of intelligent sorting devices decreases gradually from a large granularity sorting grade to a small granularity sorting grade; and when the initial waste ratio of the ores to be processed is less than a waste ratio threshold, the initial concentrate ratio is less than a concentrate ratio threshold, or the initial average granularity is less than an initial granularity threshold, determining, by the sorting setting unit, the sorting hierarchy structure of a plurality of intelligent sorting devices for hierarchical arrayed intelligent sorting as follows: at least one target sorting hierarchy is selected from a plurality of sorting hierarchies, and at least two intelligent sorting devices are parallelly deployed at each target sorting hierarchy.

The intelligent sorting device is capable of feeding ores of a predetermined granularity to a high speed belt of a conveying sub-device by using a feeding sub-device;

after conveying the ores of a predetermined granularity for a predetermined distance, the high speed belt of the conveying sub-device enters a steady state, and the ores of a predetermined granularity are conveyed to a sensing sub-device;

when the ores of a predetermined granularity pass directly below a radiation source of the sensing sub-device under the conveying of the belt, the X-ray source irradiates the ores of a predetermined granularity using X-rays excited by high voltage, and X-rays penetrating the ores of a predetermined granularity are attenuated to different degrees depending on different contents of measured elements;

a detector of the sensing sub-device located under the belt collects attenuation data information, converts the attenuation data information into a photoelectric digital signal, and transmits the photoelectric digital signal to an intelligent recognition sub-device of an intelligent recognition system;

the intelligent recognition sub-device generates an image to be recognized based on the photoelectric digital signal, conducts content recognition on the image to be recognized to determine ore parameters of the ores of a predetermined granularity, determines current sorting parameters based on a current grade threshold, compares the ore parameters with the current sorting parameters, marks the ores of a predetermined granularity as waste, concentrates or middlings based on a comparison result, and transmits location information of the ores marked as waste, concentrates or middlings to a blowing control unit of a separation sub-device; and when the ores of a predetermined granularity reach a predetermined position under the belt conveying of the conveying sub-device, a gas exhaust gun of the separation sub-device is controlled by the blowing control unit to blow the ores marked as waste, concentrates or middlings ore via a nozzle of the gas exhaust gun, so as to sort the waste, concentrates and middlings, and thus realize the sorting of the ores of a predetermined granularity.

Each granularity hierarchy includes: crushing processing and sieving processing, and according to a processing order from ores of a maximum granularity to ores of a minimum granularity during multi-hierarchy granularity processing, the granularity of ores acquired at each of the plurality of granularity hierarchies decreases in turn.

Each granularity hierarchy includes:

conducting crushing processing on input ores, and conducting sieving processing on ores acquired after crushing processing;

transferring ores capable of passing sieving processing to a connected intelligent sorting device or to the next granularity hierarchy; and continuing to conduct crushing processing on ores that fail to pass sieving processing until the ores are capable of passing sieving processing.

The sorting hierarchy structure of a plurality of intelligent sorting devices for hierarchical arrayed intelligent sorting includes a first sorting hierarchy, a second sorting hierarchy and a third sorting hierarchy; and the granularity hierarchy structure includes a first granularity hierarchy, a second granularity hierarchy and a third granularity hierarchy.

The method further includes: cyclically conducting primary crushing and primary sieving on the ores to be processed by using crushing processing of the first granularity hierarchy to acquire ores within a first crushing granularity range and ores within a second crushing granularity range;

conducting sorting on the ores within the first crushing granularity range by using each intelligent sorting device in the first sorting hierarchy to acquire waste, primary concentrates and primary middlings;

cyclically conducting secondary crushing and secondary sieving on the primary middlings and the ores within the second crushing granularity range by using crushing processing of the second granularity hierarchy to acquire ores within a third crushing granularity range and ores within a fourth crushing granularity range;

conducting sorting on the ores within the third crushing granularity range by using each intelligent sorting device in the second sorting hierarchy to acquire waste, secondary concentrates and secondary middlings;

cyclically conducting third crushing and third sieving on the secondary middlings by using crushing processing of the third granularity hierarchy to acquire ores within a fourth crushing granularity range and ores within a fifth crushing granularity range; and conducting sorting on the ores within the fifth crushing granularity range by using each intelligent sorting device in the third sorting hierarchy to acquire waste and third concentrates.

The second sorting hierarchy and/or the third sorting hierarchy include/includes a plurality of intelligent sorting devices connected in parallel.

The first crushing granularity range is a granularity range less than or equal to a first granularity and greater than or equal to a second granularity;

the second crushing granularity range is a granularity range less than the second granularity and greater than 0;

the third crushing granularity range is a granularity range less than the second granularity and greater than or equal to a third granularity;

the fourth crushing granularity range is a granularity range less than the third granularity and greater than 0; and the fifth crushing granularity range is a granularity range less than the fourth granularity and greater than or equal to the third granularity;

where the first granularity is greater than the second granularity, the second granularity is greater than the third granularity, and the fourth granularity is greater than the third granularity.

Each processing hierarchy includes a granularity hierarchy and a sorting hierarchy.

After the determining, according to the parameter information, the number of intelligent sorting devices and a sorting hierarchy structure of a plurality of intelligent sorting devices for hierarchical arrayed intelligent sorting, the method further includes:

configuring each of the intelligent sorting devices, wherein a plurality of intelligent sorting devices in the same sorting hierarchy are configured to sort ores within the same crushing granularity range, and intelligent sorting devices in different sorting hierarchies are configured to sort ores within different crushing granularity ranges.

The configuring each of the intelligent sorting devices includes:

determining a current sorting hierarchy of an intelligent sorting device to be configured;

determining a current crushing granularity range corresponding to the current sorting hierarchy;

determining, according to the current crushing granularity range, a selected spectral band of X-rays; and setting a spectral band of a radiation source of the intelligent sorting device to be configured as the selected spectral band.

The configuring each of the intelligent sorting devices includes:

determining a current sorting hierarchy of an intelligent sorting device to be configured;

determining a current crushing granularity range corresponding to the current sorting hierarchy;

determining, according to the current crushing granularity range, a target abrasive resistance of a carrier belt; and determining, according to the target abrasive resistance, the carrier belt with a selected thickness and a selected material for the intelligent sorting device to be configured.

The configuring each of the intelligent sorting devices includes:

determining a current sorting hierarchy of an intelligent sorting device to be configured;

determining a current crushing granularity range corresponding to the current sorting hierarchy;

determining, according to the current crushing granularity range, gas spraying parameters of the intelligent sorting device to be configured; and setting a blowing control unit of the intelligent sorting device to be configured according to the gas spraying parameters, wherein the blowing control unit controls a gas exhaust gun according to the gas spraying parameters, so that each nozzle of the gas exhaust gun is capable of spraying gas of predetermined pressure or strength; and the gas spraying parameters include a caliber size of the nozzle, airflow pressure and/or a time length of a single spray.

The intelligent sorting device is capable of sorting at least two different types of ores by using a gas exhaust gun, where the gas exhaust gun includes a plurality of nozzles, and each of the nozzles is capable of spraying gas at a predetermined time and with a predetermined pressure under the control of a blowing control unit.

The sorting at least two different types of ores by using a gas exhaust gun includes:

controlling, by the blowing control unit, airflow pressure of gas sprayed by the nozzles of the gas exhaust gun so that the sprayed gas exerts different striking forces on each of at least two different types of ores, and thus each type of ores are allowed to enter a corresponding feed bin.

The gas exhaust gun is located on one side of an ore path, and includes at least one row of nozzles, and different striking forces of the airflow sprayed by the nozzles can be acquired by controlling effective calibers of the nozzles, or by controlling the airflow pressure of the gas sprayed by the nozzles.

The gas exhaust gun is located on two sides of an ore path, and the gas exhaust gun on each of the two sides includes at least one row of nozzles so that the gas exhaust gun sprays gas from two different directions to strike at least two different types of ores.

According to still another aspect of the present disclosure, a method for conducting phosphate ore presorting based on arrayed intelligent sorting is provided, including:

step 101: raw ores are initially broken with the crushing granularity controlled at N1 mm-N2 mm, and the crushed ores pass through a first sieving system for sieving, where ores with the granularity greater than N2 mm are returned to a crusher through circulation, ores with the granularity less than N1 min enter a second sieving system, and ores with the intermediate granularity of N1 mm-N2 mm enter a first sorting system.

step 102: the first sorting system sorts the incoming phosphate ores into worthless waste with a grade lower than M1, marketable ores with a grade greater than M2, and middlings with a grade between the two.

step 103: the middlings enter an intermediate crushing or fine crushing system for crushing, and then the crushed ores enter a second sieving for sieving, where ores with the granularity greater than N1 mm are returned to a crusher through circulation, ores with the granularity less than n1 mm enter a fine ore collecting system, and ores with the intermediate granularity of n1 mm-N1 mm enter a second sorting system for sorting.

The first sorting system and the second sorting system are both X-ray intelligent sorters, including a sensing system, an intelligent recognition system and a separation system.

The second sorting system consists of a plurality of intelligent sorters connected in parallel.

The second sorting system sorts the incoming phosphate ores into tailings, concentrates and middlings according to the grade, and the middlings acquired by sorting are crushed and sieved, and then sent to the third sorting system for sorting.

N1 is a value greater than or equal to 40, and N2 is a value less than or equal to 100; or N1 is a value greater than or equal to 45, and N2 is a value less than or equal to 90; N1 is 50, and N2 is 80; n1 is within a range of 8-13; n1=10.

According to still another aspect of the present disclosure, a computer-readable storage medium is provided, where the storage medium stores a computer program configured to implement the method according to any one of the above.

According to still another aspect of the present disclosure, an electronic device is provided, including:

a processor; and a memory configured to store an instruction executable by the processor, where the processor is configured to read the executable instruction from the memory, and execute the instruction to implement the method according to any one of the above.

According to the present disclosure, ores such as phosphate ores are crushed into different granularities, and waste and concentrates are recognized and separated within each granularity range, which reduces the fine ore ratio, improves the grade of fine ores, and avoids the problem of high energy consumption for crushing all ores into small granularities.

BRIEF DESCRIPTION OF DRAWINGS

The exemplary embodiments of the present disclosure can be more fully understood by reference to the following accompanying drawings.

DETAILED DESCRIPTION OF THE EMBODIMENTS

Figure 1:
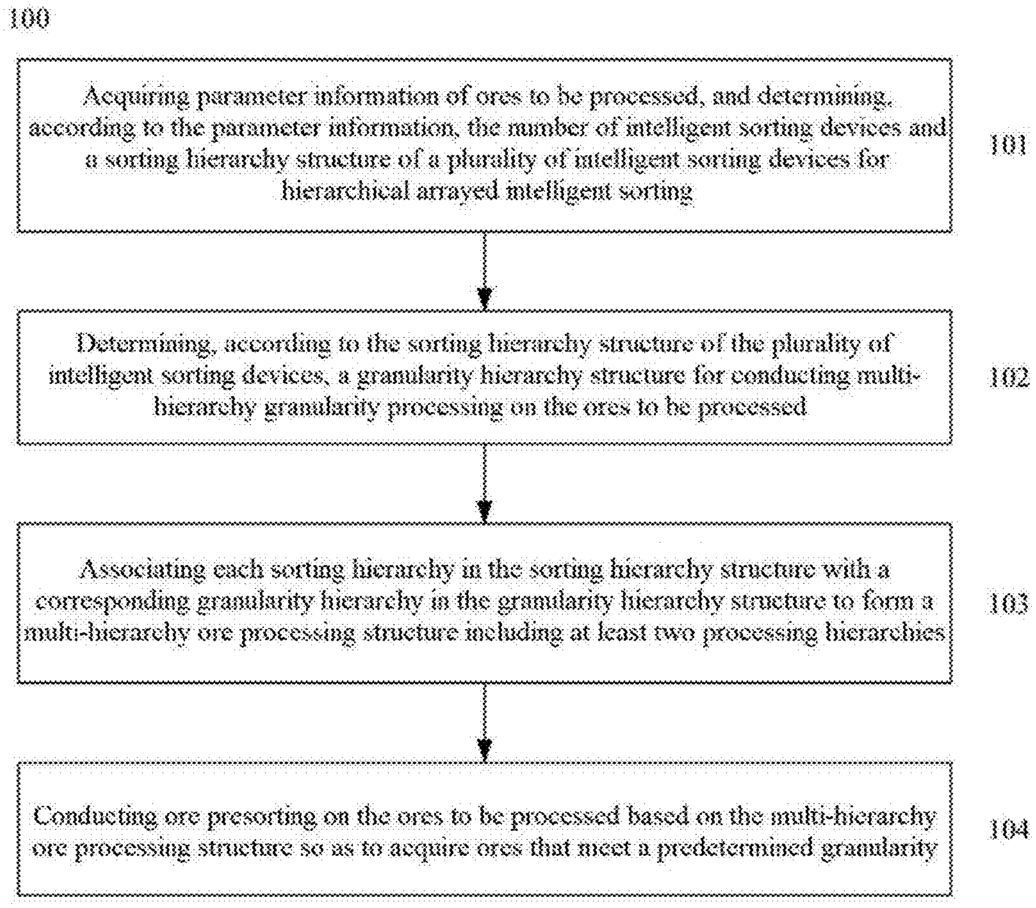
FIG. 1 is a flowchart of a method for conducting ore presorting based on hierarchical arrayed intelligent sorting according to an embodiment of the present disclosure.

FIG. 1 is a flowchart of method 100 for conducting ore presorting based on hierarchical arrayed intelligent sorting according to an embodiment of the present disclosure. Method 100 starts with step 101.

Step 101: acquire parameter information of ores to be processed, and determine, according to the parameter information, the number of intelligent sorting devices and a sorting hierarchy structure of a plurality of intelligent sorting devices for hierarchical arrayed intelligent sorting, where the sorting hierarchy structure includes at least two sorting hierarchies, and each of the sorting hierarchies includes at least one intelligent sorting device; where the determine, according to the parameter information, the number of intelligent sorting devices and a sorting hierarchy structure of a plurality of intelligent sorting devices for hierarchical arrayed intelligent sorting includes: acquire a configuration file associated with ore presorting, and determine a throughput of ore presorting according to the configuration file; analyze the parameter information to determine an initial waste ratio, an initial concentrate ratio and an initial average granularity of the ores to be processed; and determine, based on the throughput, the number of intelligent sorting devices, and determine, based on the initial waste ratio, the initial concentrate ratio and the initial average granularity of the ores to be processed, the sorting hierarchy structure of a plurality of intelligent sorting devices for hierarchical arrayed intelligent sorting.

The determine, based on the throughput, the number of intelligent sorting devices includes: determine an ore sorting amount per unit time for each intelligent sorting device; and determine, based on the ore sorting amount per unit time for each intelligent sorting device and the throughput, the number of intelligent sorting devices.

The determine, based on the initial waste ratio, the initial concentrate ratio and the initial average granularity of the ores to be processed, the sorting hierarchy structure of a plurality of intelligent sorting devices for hierarchical arrayed intelligent sorting includes: when the initial waste ratio of the ores to be processed is greater than or equal to a waste ratio threshold, the initial concentrate ratio is greater than or equal to a concentrate ratio threshold, or the initial average granularity is greater than or equal to an initial granularity threshold, determine the sorting hierarchy structure of a plurality of intelligent sorting devices for hierarchical arrayed intelligent sorting as follows: the number of intelligent sorting devices decreases gradually from a large granularity sorting grade to a small granularity sorting grade; and when the initial waste ratio of the ores to be processed is less than a waste ratio threshold, the initial concentrate ratio is less than a concentrate ratio threshold, or the initial average granularity is less than an initial granularity threshold, determine the sorting hierarchy structure of a plurality of intelligent sorting devices for hierarchical arrayed intelligent sorting as follows: at least one target sorting hierarchy is selected from a plurality of sorting hierarchies, and at least two intelligent sorting devices are parallelly deployed at each target sorting hierarchy.

Figure 4:
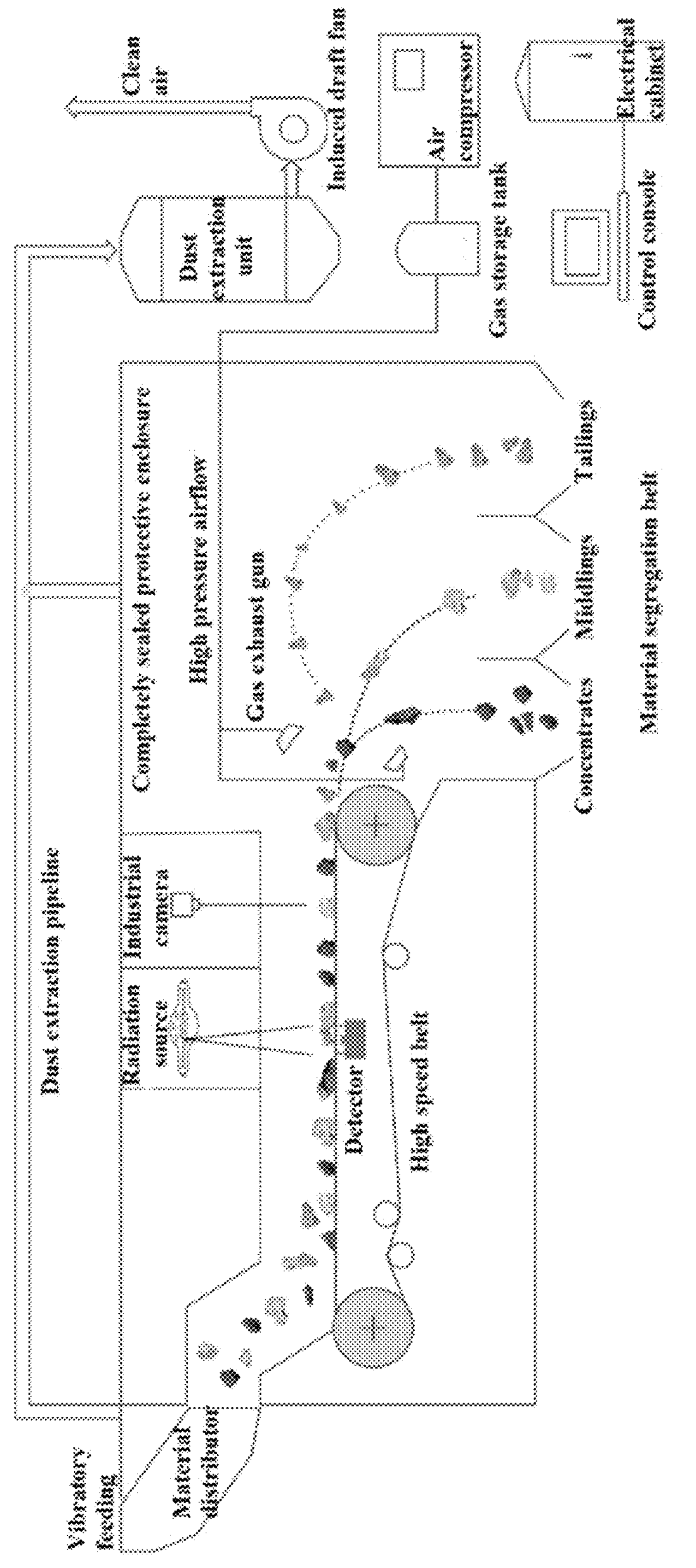
FIG. 4 is a schematic structural diagram of an intelligent sorting system according to an embodiment of the present disclosure.

FIG. 4 is a schematic structural diagram of an intelligent sorting system according to an embodiment of the present disclosure. As shown in FIG. 4, the intelligent sorting device is capable of feeding ores of a predetermined granularity to a high speed belt of a conveying sub-device by using a feeding sub-device; after conveying the ores of a predetermined granularity for a predetermined distance, the high speed belt of the conveying sub-device enters a steady state, and the ores of a predetermined granularity are conveyed to a sensing sub-device; when the ores of a predetermined granularity pass directly below a radiation source of the sensing sub-device under the conveying of the belt, the X-ray source irradiates the ores of a predetermined granularity using X-rays excited by high voltage, and X-rays penetrating the ores of a predetermined granularity are attenuated to different degrees depending on different contents of measured elements;

a detector of the sensing sub-device located under the belt collects attenuation data information, converts the attenuation data information into a photoelectric digital signal, and transmits the photoelectric digital signal to an intelligent recognition sub-device of an intelligent recognition system;

the intelligent recognition sub-device generates an image to be recognized based on the photoelectric digital signal, conducts content recognition on the image to be recognized to determine ore parameters of the ores of a predetermined granularity, determines current sorting parameters based on a current grade threshold, compares the ore parameters with the current sorting parameters, marks the ores of a predetermined granularity as waste, concentrates or middlings based on a comparison result, and transmits location information of the ores marked as waste, concentrates or middlings to a blowing control unit of a separation sub-device; and when the ores of a predetermined granularity reach a predetermined position under the belt conveying of the conveying sub-device, a gas exhaust gun of the separation sub-device is controlled by the blowing control unit to blow the ores marked as waste, concentrates or middlings ore via a nozzle of the gas exhaust gun, so as to sort the waste, concentrates and middlings, and thus realize the sorting of the ores of a predetermined granularity.

For example, the intelligent large granularity sorter may sort ores into three types, namely: a) worthless waste with the grade lower than M1, such as phosphate ores with a grade less than about 12. The value of this part of ores is so low that they can be directly discarded after being sieved out. In general, the grade parameter M1 used for sieving can be determined according to the specific ore value and production cost. b) Concentrate with a grade higher than M2, such as phosphate ores with a grade greater than 27. This part of ores can be sold as marketable ores after being sieved out. Correspondingly, the grade parameter M2 used for sieving can be determined according to the marketing demand. c) Middlings with a grade between M1 and M2 (including end points M1 and M2), such as phosphate ores with a grade of 12-27.

Step 102: determine, according to the sorting hierarchy structure of the plurality of intelligent sorting devices, a granularity hierarchy structure for conducting multi-hierarchy granularity processing on the ores to be processed, where the granularity hierarchy structure includes at least two granularity hierarchies.

Each granularity hierarchy includes: crushing processing and sieving processing, and according to a processing order from ores of a maximum granularity to ores of a minimum granularity during multi-hierarchy granularity processing, the granularity of ores acquired at each of the plurality of granularity hierarchies decreases in turn.

Each granularity hierarchy includes conducting crushing processing on input ores, and conducting sieving processing on ores acquired after crushing processing; transferring ores capable of passing sieving processing to a connected intelligent sorting device or to the next granularity hierarchy; and continuing to conduct crushing processing on ores that fail to pass sieving processing until the ores are capable of passing sieving processing.

For example, the sieving system sieves ores of three different granularities, respectively, in accordance with the following way: a) ores with the granularity of N1 mm-N2 mm (including end points N1 mm and N2 mm) are fed into the intelligent large granularity sorter for intelligent sorting; b) ores with the granularity less than N1 mm are fed into sieving system 2 for secondary sieving; and c) ores with the granularity greater than N2 mm are fed into an initial crushing system for secondary crushing.

Preferably, N1 is a value greater than or equal to 40, and N2 is a value less than or equal to 100. More preferably, N1 is a value greater than or equal to 45, and N2 is a value less than or equal to 90. Further, N1 is 50, and N2 is 80. It should be understood that actual figures in this application are indicative and not restrictive.

Figure 2:
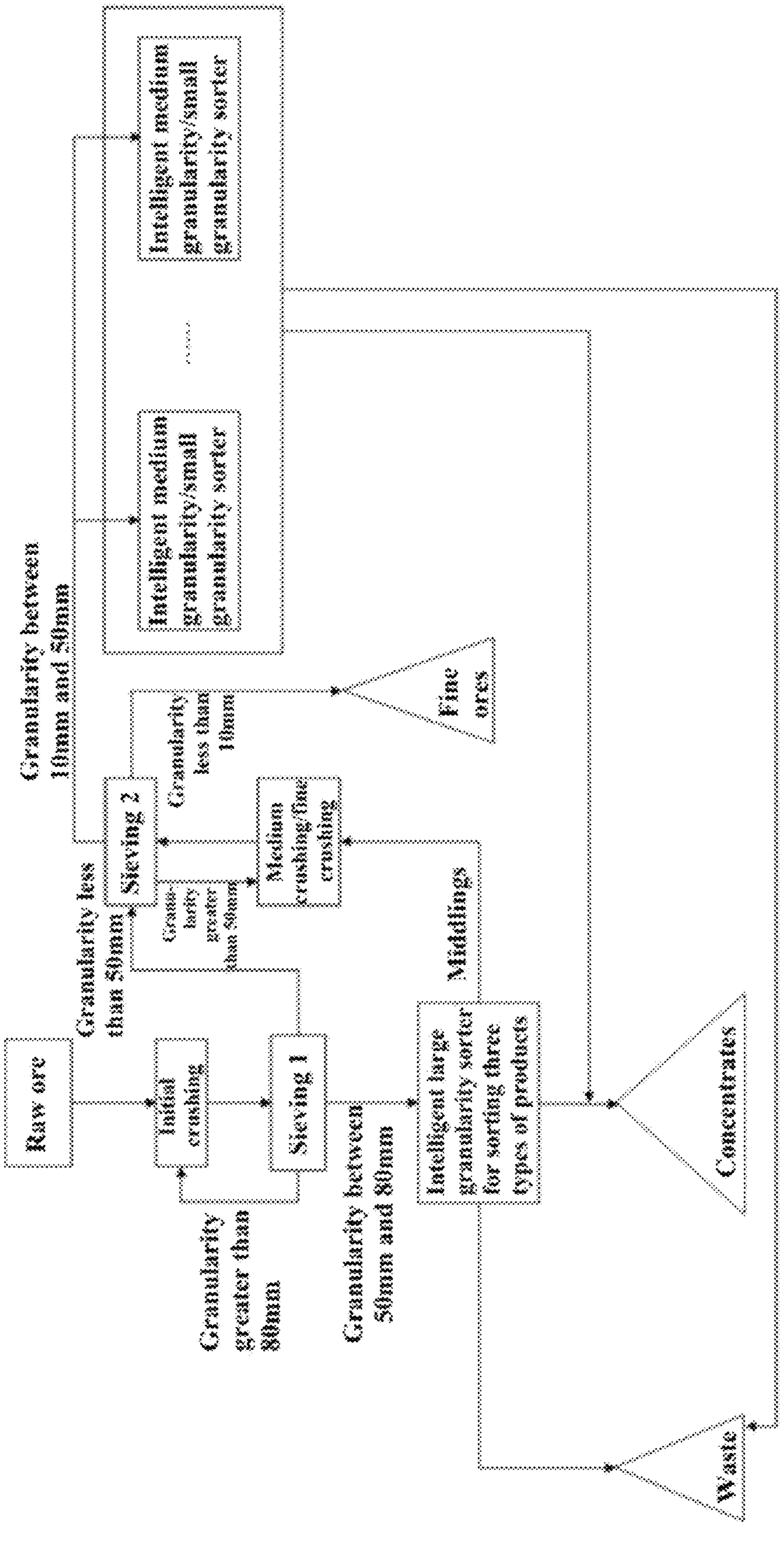
FIG. 2 is a flowchart of a method for conducting ore presorting based on hierarchical arrayed intelligent sorting according to another embodiment of the present disclosure.

Step 103: associate each sorting hierarchy in the sorting hierarchy structure with a corresponding granularity hierarchy in the granularity hierarchy structure to form a multi-hierarchy ore processing structure comprising at least two processing hierarchies. An example of the multi-hierarchy ore processing structure is shown in FIG. 2. It should be understood that any reasonable number of sorters, crushing systems and sieving systems can be set up at each processing hierarchy, and any reasonable structural arrangement (e.g., parallel connection, series connection or a mixture of parallel connection and series connection) can be made for sorters, crushing systems and sieving systems at the same processing hierarchy.

The sorting hierarchy structure of a plurality of intelligent sorting devices for hierarchical arrayed intelligent sorting includes a first sorting hierarchy, a second sorting hierarchy and a third sorting hierarchy; and the granularity hierarchy structure includes a first granularity hierarchy, a second granularity hierarchy and a third granularity hierarchy.

The method further includes: cyclically conducting primary crushing and primary sieving on the ores to be processed by using crushing processing of the first granularity hierarchy to acquire ores within a first crushing granularity range and ores within a second crushing granularity range; conducting sorting on the ores within the first crushing granularity range by using each intelligent sorting device in the first sorting hierarchy to acquire waste, primary concentrates and primary middlings; cyclically conducting secondary crushing and secondary sieving on the primary middlings and the ores within the second crushing granularity range by using crushing processing of the second granularity hierarchy to acquire ores within a third crushing granularity range and ores within a fourth crushing granularity range; conducting sorting on the ores within the third crushing granularity range by using each intelligent sorting device in the second sorting hierarchy to acquire waste, secondary concentrates and secondary middlings; cyclically conducting third crushing and third sieving on the secondary middlings by using crushing processing of the third granularity hierarchy to acquire ores within a fourth crushing granularity range and ores within a fifth crushing granularity range; and conducting sorting on the ores within the fifth crushing granularity range by using each intelligent sorting device in the third sorting hierarchy to acquire waste and third concentrates.

The second sorting hierarchy and/or the third sorting hierarchy include/includes a plurality of intelligent sorting devices connected in parallel. The first crushing granularity range is a granularity range less than or equal to a first granularity and greater than or equal to a second granularity; the second crushing granularity range is a granularity range less than the second granularity and greater than 0; the third crushing granularity range is a granularity range less than the second granularity and greater than or equal to a third granularity; the fourth crushing granularity range is a granularity range less than the third granularity and greater than 0; and the fifth crushing granularity range is a granularity range less than the fourth granularity and greater than or equal to the third granularity; where the first granularity is greater than the second granularity, the second granularity is greater than the third granularity, and the fourth granularity is greater than the third granularity.

Step 104: conduct ore presorting on the ores to be processed based on the multi-hierarchy ore processing structure so as to acquire ores that meet a predetermined granularity.

Each processing hierarchy includes a granularity hierarchy and a sorting hierarchy. After the determining, according to the parameter information, the number of intelligent sorting devices and a sorting hierarchy structure of a plurality of intelligent sorting devices for hierarchical arrayed intelligent sorting, the method further includes:

configuring each of the intelligent sorting devices, wherein a plurality of intelligent sorting devices in the same sorting hierarchy are configured to sort ores within the same crushing granularity range, and intelligent sorting devices in different sorting hierarchies are configured to sort ores within different crushing granularity ranges.

The configuring each of the intelligent sorting devices includes: determining a current sorting hierarchy of an intelligent sorting device to be configured; determining a current crushing granularity range corresponding to the current sorting hierarchy; determining, according to the current crushing granularity range, a selected spectral band of X-rays; and setting a spectral band of a radiation source of the intelligent sorting device to be configured as the selected spectral band.

The configuring each of the intelligent sorting devices includes: determining a current sorting hierarchy of an intelligent sorting device to be configured; determining a current crushing granularity range corresponding to the current sorting hierarchy; determining, according to the current crushing granularity range, a target abrasive resistance of a carrier belt; and determining, according to the target abrasive resistance, the carrier belt with a selected thickness and a selected material for the intelligent sorting device to be configured.

The configuring each of the intelligent sorting devices includes: determining a current sorting hierarchy of an intelligent sorting device to be configured; determining a current crushing granularity range corresponding to the current sorting hierarchy; determining, according to the current crushing granularity range, gas spraying parameters of the intelligent sorting device to be configured; and setting a blowing control unit of the intelligent sorting device to be configured according to the gas spraying parameters, wherein the blowing control unit controls a gas exhaust gun according to the gas spraying parameters, so that each nozzle of the gas exhaust gun is capable of spraying gas of predetermined pressure or strength; and the gas spraying parameters include a caliber size of the nozzle, airflow pressure and/or a time length of a single spray.

The intelligent sorting device is capable of sorting at least two different types of ores by using a gas exhaust gun, where the gas exhaust gun includes a plurality of nozzles, and each of the nozzles is capable of spraying gas at a predetermined time and with a predetermined pressure under the control of a blowing control unit.

The sorting at least two different types of ores by using a gas exhaust gun comprises: controlling, by the blowing control unit, airflow pressure of gas sprayed by the nozzles of the gas exhaust gun so that the sprayed gas exerts different striking forces on each of at least two different types of ores, and thus each type of ores are allowed to enter a corresponding feed bin.

The gas exhaust gun is located on one side of an ore path, and includes at least one row of nozzles, and different striking forces of the airflow sprayed by the nozzles can be acquired by controlling effective calibers of the nozzles, or by controlling the airflow pressure of the gas sprayed by the nozzles. The gas exhaust gun is located on two sides of an ore path, and the gas exhaust gun on each of the two sides includes at least one row of nozzles so that the gas exhaust gun sprays gas from two different directions to strike at least two different types of ores.

Upon the processing at the previous processing hierarchy (part of the concentrates can be sold directly, and the other part of the waste is discarded), ores entering the next processing hierarchy are only part of ores to be sorted, so the quantity of ore objects to be crushed and sieved is reduced, and the number of intelligent sorting devices configured at the next processing hierarchy can be reduced, which reduces equipment investment, site occupation and energy consumption while ensuring the same yield. At the same time, the quantity of ores that need to be crushed in the granularity of the next processing hierarchy is reduced, which not only reduces the production rate of fine ores, but also improves the fine ore to a marketable grade. FIG. 2 is a flowchart of a method for conducting ore presorting based on hierarchical arrayed intelligent sorting according to another embodiment of the present disclosure.

Step A: conduct initial crushing and sieving on raw ores. As shown in FIG. 2, the raw ores enter sieving system 1 after passing through an initial crushing system, and sieving system 1 sieves out ores of three different granularities, which are processed in the following ways:

a) ores with the granularity of N1 mm-N2 mm (including end points N1 mm and N2 mm) are fed into the intelligent large granularity sorter for intelligent sorting;

b) ores with the granularity less than N1 mm are fed into sieving system 2 for secondary sieving; and c) ores with the granularity greater than N2 mm are fed into an initial crushing system for secondary crushing.

Preferably, N1 is a value greater than or equal to 40, and N2 is a value less than or equal to 100. More preferably. N1 is a value greater than or equal to 45, and N2 is a value less than or equal to 90. Further, N1 is 50, and N2 is 80. It should be understood that actual figures in this application are indicative and not restrictive.

Step B: the intelligent large granularity sorter conducts intelligent sorting on ores with the granularity of N1 mm-N2 mm. By defining sorting parameters, the intelligent large granularity sorter may sort ores into three types, namely:

a) worthless waste with the grade lower than M1, such as phosphate ores with a grade less than about 12. The value of this part of ores is so low that they can be directly discarded after being sieved out. In general, the grade parameter M1 used for sieving can be determined according to the specific ore value and production cost.

b) concentrate with a grade higher than M2, such as phosphate ores with a grade greater than 27. This part of ores can be sold as marketable ores after being sieved out. Correspondingly, the grade parameter M2 used for sieving can be determined according to the marketing demand.

c) middlings with a grade between M1 and M2 (including end points M1 and M2), such as phosphate ores with a grade of 12-27.

The intelligent sorter includes a feeding system, a transmission system, a sensing system, an intelligent recognition system, an separation system, etc. Step A: Sieve out graded ores, and feed the ores into the high speed belt of the transmission system through the feeding system. After running for a given distance, adjust the high speed belt to a steady state, and transmit the ores to the sensing system. When the ores pass directly below the radiation source, irradiate the ores by using X-rays excited by high voltage. The ore blocks on the conveyor belt weakens the ray intensity, so that the X-rays penetrating the ores are attenuated to different degrees depending on different contents of measured elements in the ores. A detector under the conveyor belt collects attenuation intensity data information, converts the attenuation intensity data information into a photoelectric digital signal, and transmits the photoelectric digital signal to an industrial control computer of an intelligent recognition system, intelligent sorting software is run in the industrial control computer to conduct image processing of the data and conduct analysis and recognition. According to the preset sorting parameters, the industrial control computer distinguishes and marks ore blocks as waste a, concentrates b and middlings c, and sends the marked ore position information to a blowing control unit of the separation system. The ore blocks pass through the gas exhaust gun of the separation system after flying away from the belt of the transmission system, and the marked waste a, concentrates b and middlings e are accurately blown through the nozzles of the gas exhaust gun, thus isolating the waste a, concentrates b and middlings c.

Step C: Feed the middlings separated by the intelligent large granularity sorter into an intermediate crushing or fine crushing system for secondary crushing, and after crushing, feed the ores into sieving system 2 for secondary sieving.

Sieving system 2 conducts sieving processing. The ores fed into the sieving system 2 include: ores sieved out by sieving system 1 in Step A with the granularity less than N1 mm, and ores acquired after secondary crushing of middlings with the granularity of N1 mm-N2 mm sorted by the intelligent sorter in Step B.

Sieving system 2 sieves out ores of three different granularities, which are processed in the following ways:

a) ores with the granularity less than k1 mm directly enter fine ores: k1 is usually 8-13, and preferably, k1=10;
b) ores with the granularity greater than N1 mm are fed into an intermediate crushing or fine crushing system for secondary crushing; and
c) ores with the granularity of k1 mm-N1 mm are fed into the intelligent medium granularity sorter or small granularity sorter for sorting.

It should be understood that whether to sort ores of three different granularities or ores of two different granularities is determined according to the process hierarchy of the intelligent sorting device. For example, if the process hierarchy of the intelligent sorting device is the last hierarchy or the lowest hierarchy, the intelligent sorting device sorts ores of two different granularities, namely, waste and concentrates. If the process hierarchy of the intelligent sorting device is not the last hierarchy or the lowest hierarchy, the intelligent sorting device sorts ores of three different granularities, namely, waste, middlings (intermediate ores) and concentrates.

It should be understood that intelligent large granularity sorters, medium granularity sorters and small granularity sorters can be set with different conveyor belt materials, conveyor belt thicknesses, conveyor motors, X-ray parameters, blowing intensity, etc.

There are three options to achieve a large output of an intelligent sorter: (1) widen the belt width, which will lead to the increase of the equipment width, and impose certain limitations to the optical path design, that is, there are limitations. (2) Increase the belt speed, which will greatly increase the length of the intelligent sorter. Both options pose huge challenges to the equipment design and the requirements of the installation site. At the same time, the current equipment prices are basically linked to these two indicators, which are the main parameters of equipment models. Manufacturers generally provide only few devices to choose from, which will increase the burden on customers. (3) In the case of a specified model, increasing production can only rely on the third option, that is, to increase the granularities of the ore to be processed. Example: On the premise of using the same photometric sorter, the output acquired for processing ores of 35 mm-70 mm is more than four times that acquired for processing ores of 10-35 mm.

For example, the intelligent large granularity sorter is improved with technology.

1. Modulate the appropriate spectral band to irradiate large particles with X-rays. The penetrating capability of X-rays is directly related to the thickness of the irradiated object: the larger the particle, the greater the thickness of the ore penetrated by X-rays, so it is necessary to design the spectral range of X-rays.

2. The large-granularity ores wear devices, especially the carrier belt. In this case, it is required to use wear-resistant materials and material thicknesses suitable for large granularities. However, the change of material and thickness should not bring excessive attenuation of X-rays (which excessively weakens the signal intensity).

3. The large-granularity ores need to be matched with sprayed airflow with higher pressure and strength. By increasing the coverage area of a single nozzle, the inertia of the ores can be effectively overcome, so that the ores can enter a new orbit after being stroke by the airflow.

4. At present, the solution is achieved on the premise that the device can realize the dual change of the ore path, which can be obtained in the following ways:

4.1. For the same row of nozzles, the striking strength is changed by controlling the pressure of airflow sprayed by the nozzles, so that there are three flight paths: path produced when ores are not stroke, path produced when ores are stroke lightly, and path produced when ores are stroke heavily, and thus the ores enter three feed bins.

4.2. For the same row of nozzles, the intensity of striking airflow of different single nozzles is obtained by controlling the effective opening area of the nozzles, and the subsequent operation is the same as that in 4.1.

4.3. Two rows of nozzles are located on the same side, but are designed with different air pressure and nozzle coverage areas.

4.4. Two rows of nozzles are located on both sides of the ore path, hitting the ores from two different directions.

5. In order to effectively classify and recognize large-granularity ores, the algorithm should be able to recognize concentrates, middlings and tailings.

In the technological process of this application, the output of the intelligent large granularity photometric sorter located at the front end is much greater than that of the intelligent medium granularity photometric sorter/intelligent small granularity photometric sorter located at the back end. Refer to a production example of phosphate ores with an annual output of 1 million tons. In the case of photoelectric sorting, and the liberation granularity is 40 mm, if the current sorting process is adopted, the ores are completely crushed to 40 mm or below, and the resulting fine ore (<10 mm) rate is about 40%. For the sorter of the conventional model, the output of the ores of 10 mm-40 mm is about 60 tons per hour. At this time, the sorter needs to be connected in parallel with about 3 sorter to meet the output (16 production hours per day). According to this solution, when the grade of raw ores is poor, it is very likely that the fine ore cannot meet the index of marketable ores and thus cannot be sold. If production is achieved with the structure of series connection, parallel connection or the mixture of series connection and parallel connection shown in the present disclosure, initial sorting can be carried out first under crushing of 40 mm-80 mm. At this time, under the same model of the sorter, the output of a single device is more than 150 tons. One sorter can sort all the ores. Besides, after the sorted middlings are crushed again, the quantity of middlings is reduced compared with the quantity of raw ores, so that sorting of 10 mm-40 mm can be completed only by connecting another sorter in series with the sorter. Without changing the model selection of the sorter, this sorting process reduces the use of 1 sorter, and at the same time, only middlings are crushed after sorting, which not only reduces the production rate of fine ores, but also improves the fine ore to a marketable grade.

For the sorter with the same transmission belt width and the same transmission belt speed, there may be some differences in the design of signal acquisition, recognition and separation systems due to different granularities to be processed. Therefore, the sorter has the capability of processing ores of different granularities. Taking phosphate ores as an example, increasing the granularity of ores amplifies the migration of energy spectrum as X-ray signals get attenuated, and more algorithm corrections are required to complete effective recognition.

At the back end, optionally, a plurality of intelligent medium/small granularity sorters are connected in parallel for sorting, or the intelligent medium/small granularity photometric sorter at the back end is also set to three sorting results, and re-sorting, crushing and sieving are carried out in accordance with the step similar to step B and step C.

If necessary, the process described in the present disclosure can be copied to further refine the granularity control of crushing, sieving and sorting. In each link, all that is needed is to effectively separate completely liberated ores within this granularity range, so as to produce two effective products of tailings (namely waste) and concentrates. At the same time, the third product, namely unliberated middlings are fed to the next process for crushing, sieving and sorting.

Under a large granularity, there is certainly a situation where some ores are liberated, and some ores are not liberated. According to the technical solution of the present disclosure, an intelligent sorter with the capability of recognizing and isolating three types of products is adopted, which can discard the liberated waste, pick out pure concentrates directly as marketable ores, and feed the unliberated middlings to the next process. Only the middlings need to be crushed again, which greatly reduces the quantity of phosphate ores when the phosphate ores are crushed to the dissociation granularity of 10-35 mm, the fine ore rate is greatly reduced, and the energy consumption of crushing is also greatly reduced. According to the solution in the present disclosure, only the crushed middlings are re-sorted, so that a plurality of intelligent photoelectric sorters can be juxtaposed to complete the output with the required throughput.

Figure 3:
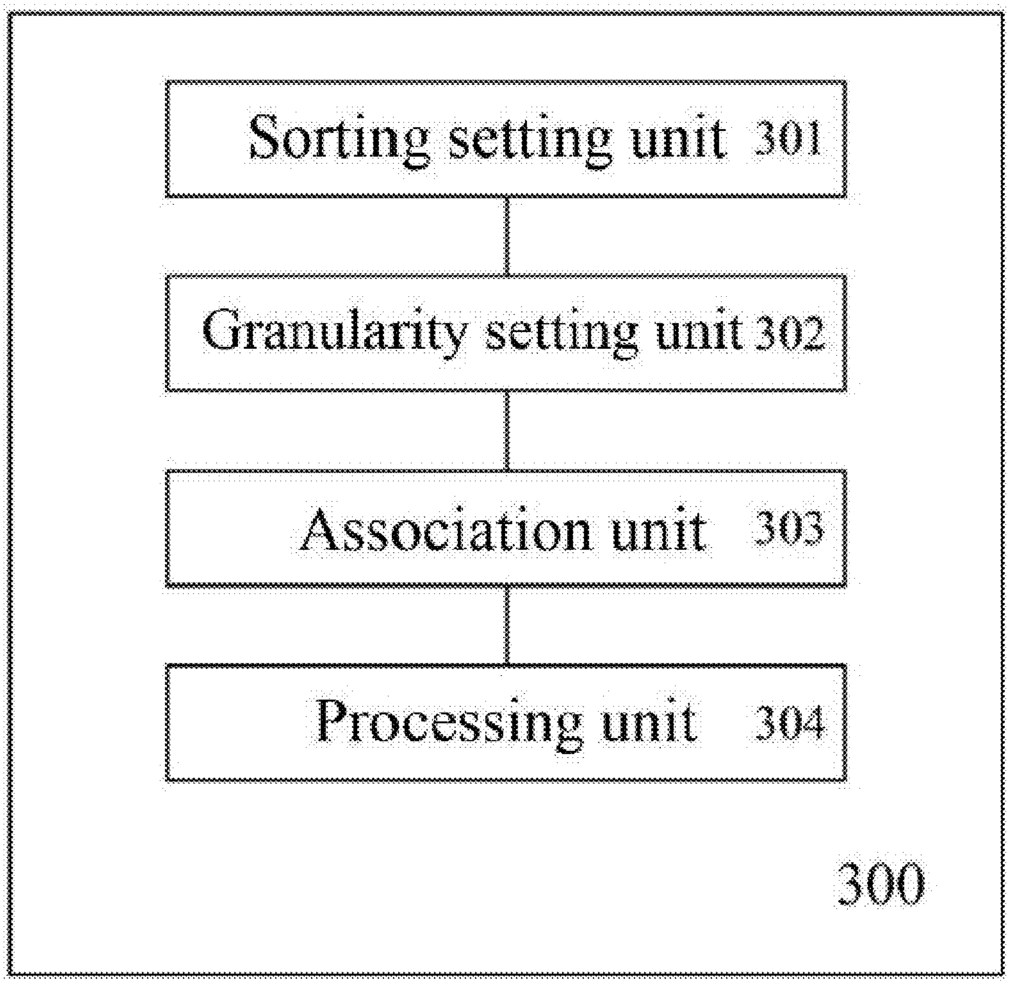
FIG. 3 is a schematic structural diagram of a device for conducting ore presorting based on hierarchical arrayed intelligent sorting according to an embodiment of the present disclosure.

FIG. 3 is a schematic structural diagram of a system for conducting ore presorting based on hierarchical arrayed intelligent sorting according to an embodiment of the present disclosure. System 300 includes sorting setting unit 301, granularity setting unit 302, association unit 303 and processing unit 304.

sorting setting unit 301 is configured to acquire parameter information of ores to be processed, and determine, according to the parameter information, the number of intelligent sorting devices and a sorting hierarchy structure of a plurality of intelligent sorting devices for hierarchical arrayed intelligent sorting, where the sorting hierarchy structure includes at least two sorting hierarchies, and each of the sorting hierarchies includes at least one intelligent sorting device.

The determine, according to the parameter information, the number of intelligent sorting devices and a sorting hierarchy structure of a plurality of intelligent sorting devices for hierarchical arrayed intelligent sorting includes: acquire a configuration file associated with ore presorting, and determine a throughput of ore presorting according to the configuration file; analyzing the parameter information to determine an initial waste ratio, an initial concentrate ratio and an initial average granularity of the ores to be processed; and determining, based on the throughput, the number of intelligent sorting devices, and determining, based on the initial waste ratio, the initial concentrate ratio and the initial average granularity of the ores to be processed, the sorting hierarchy structure of a plurality of intelligent sorting devices for hierarchical arrayed intelligent sorting.

The determining, based on the throughput, the number of intelligent sorting devices includes: determining an ore sorting amount per unit time for each intelligent sorting device; and determining, based on the ore sorting amount per unit time for each intelligent sorting device and the throughput, the number of intelligent sorting devices.

The determining, based on the initial waste ratio, the initial concentrate ratio and the initial average granularity of the ores to be processed, the sorting hierarchy structure of a plurality of intelligent sorting devices for hierarchical arrayed intelligent sorting includes: when the initial waste ratio of the ores to be processed is greater than or equal to a waste ratio threshold, the initial concentrate ratio is greater than or equal to a concentrate ratio threshold, or the initial average granularity is greater than or equal to an initial granularity threshold, determining the sorting hierarchy structure of a plurality of intelligent sorting devices for hierarchical arrayed intelligent sorting as follows: the number of intelligent sorting devices decreases gradually from a large granularity sorting grade to a small granularity sorting grade; and when the initial waste ratio of the ores to be processed is less than a waste ratio threshold, the initial concentrate ratio is less than a concentrate ratio threshold, or the initial average granularity is less than an initial granularity threshold, determining the sorting hierarchy structure of a plurality of intelligent sorting devices for hierarchical arrayed intelligent sorting as follows: at least one target sorting hierarchy is selected from a plurality of sorting hierarchies, and at least two intelligent sorting devices are parallelly deployed at each target sorting hierarchy.

The intelligent sorting device is capable of feeding ores of a predetermined granularity to a high speed belt of a conveying sub-device by using a feeding sub-device;

after conveying the ores of a predetermined granularity for a predetermined distance, the high speed belt of the conveying sub-device enters a steady state, and the ores of a predetermined granularity are conveyed to a sensing sub-device;

when the ores of a predetermined granularity pass directly below a radiation source of the sensing sub-device under the conveying of the belt, the X-ray source irradiates the ores of a predetermined granularity using X-rays excited by high voltage, and X-rays penetrating the ores of a predetermined granularity are attenuated to different degrees depending on different contents of measured elements;

a detector of the sensing sub-device located under the belt collects attenuation data information, converts the attenuation data information into a photoelectric digital signal, and transmits the photoelectric digital signal to an intelligent recognition sub-device of an intelligent recognition system;

the intelligent recognition sub-device generates an image to be recognized based on the photoelectric digital signal, conducts content recognition on the image to be recognized to determine ore parameters of the ores of a predetermined granularity, determines current sorting parameters based on a current grade threshold, compares the ore parameters with the current sorting parameters, marks the ores of a predetermined granularity as waste, concentrates or middlings based on a comparison result, and transmits location information of the ores marked as waste, concentrates or middlings to a blowing control unit of a separation sub-device; and when the ores of a predetermined granularity reach a predetermined position under the belt conveying of the conveying sub-device, a gas exhaust gun of the separation sub-device is controlled by the blowing control unit to blow the ores marked as waste, concentrates or middlings ore via a nozzle of the gas exhaust gun, so as to sort the waste, concentrates and middlings, and thus realize the sorting of the ores of a predetermined granularity.

For example, the intelligent large granularity sorter may sort ores into three types, namely: a) worthless waste with the grade lower than M1, such as phosphate ores with a grade less than about 12. The value of this part of ores is so low that they can be directly discarded after being sieved out. In general, the grade parameter M1 used for sieving can be determined according to the specific ore value and production cost. b) concentrate with a grade higher than M2, such as phosphate ores with a grade greater than 27. This part of ores can be sold as marketable ores after being sieved out. Correspondingly, the grade parameter M2 used for sieving can be determined according to the marketing demand. c) middlings with a grade between M1 and M2 (including end points M1 and M2), such as phosphate ores with a grade of 12-27.

Granularity setting unit 302 is configured to determine, according to the sorting hierarchy structure of the plurality of intelligent sorting devices, a granularity hierarchy structure for conducting multi-hierarchy granularity processing on the ores to be processed, where the granularity hierarchy structure includes at least two granularity hierarchies.

Each granularity hierarchy includes: crushing processing and sieving processing, and according to a processing order from ores of a maximum granularity to ores of a minimum granularity during multi-hierarchy granularity processing, the granularity of ores acquired at each of the plurality of granularity hierarchies decreases in turn.

Each granularity hierarchy includes conducting crushing processing on input ores according to current needs, and conducting sieving processing on ores acquired after crushing processing or input ores; transferring ores capable of passing sieving processing to a connected intelligent sorting device or to the next granularity hierarchy; and continuing to conduct crushing processing on ores that fail to pass sieving processing until the ores are capable of passing sieving processing.

For example, the sieving system sieves ores of three different granularities, respectively, in accordance with the following ways: a) ores with the granularity of N1 mm-N2 mm (including end points N1 mm and N2 mm) are fed into the intelligent large granularity sorter for intelligent sorting; b) ores with the granularity less than N1 mm are fed into sieving system 2 for secondary sieving; and c) ores with the granularity greater than N2 mm are fed into an initial crushing system for secondary crushing.

Preferably, N1 is a value greater than or equal to 40, and N2 is a value less than or equal to 100. More preferably, N1 is a value greater than or equal to 45, and N2 is a value less than or equal to 90. Further. N1 is 50, and N2 is 80. It should be understood that actual figures in this application are indicative and not restrictive.

Association unit 303 is configured to associate each sorting hierarchy in the sorting hierarchy structure with a corresponding granularity hierarchy in the granularity hierarchy structure to form a multi-hierarchy ore processing structure comprising at least two processing hierarchies. An example of the multi-hierarchy ore processing structure is shown in FIG. 2. It should be understood that any reasonable number of sorters, crushing systems and sieving systems can be set up at each processing hierarchy, and any reasonable structural arrangement (e.g., parallel connection, series connection or a mixture of parallel connection and series connection) can be made for sorters, crushing systems and sieving systems at the same processing hierarchy.

The sorting hierarchy structure of a plurality of intelligent sorting devices for hierarchical arrayed intelligent sorting includes a first sorting hierarchy, a second sorting hierarchy and a third sorting hierarchy; and the granularity hierarchy structure includes a first granularity hierarchy, a second granularity hierarchy and a third granularity hierarchy.

The method further includes: cyclically conducting primary crushing and primary sieving on the ores to be processed by using crushing processing of the first granularity hierarchy to acquire ores within a first crushing granularity range and ores within a second crushing granularity range; conducting sorting on the ores within the first crushing granularity range by using each intelligent sorting device in the first sorting hierarchy to acquire waste, primary concentrates and primary middlings; cyclically conducting secondary crushing and secondary sieving on the primary middlings and the ores within the second crushing granularity range by using crushing processing of the second granularity hierarchy to acquire ores within a third crushing granularity range and ores within a fourth crushing granularity range; conducting sorting on the ores within the third crushing granularity range by using each intelligent sorting device in the second sorting hierarchy to acquire waste, secondary concentrates and secondary middlings; cyclically conducting third crushing and third sieving on the secondary middlings by using crushing processing of the third granularity hierarchy to acquire ores within a fourth crushing granularity range and ores within a fifth crushing granularity range; and conducting sorting on the ores within the fifth crushing granularity range by using each intelligent sorting device in the third sorting hierarchy to acquire waste and third concentrates.

The second sorting hierarchy and/or the third sorting hierarchy include/includes a plurality of intelligent sorting devices connected in parallel. The first crushing granularity range is a granularity range less than or equal to a first granularity and greater than or equal to a second granularity; the second crushing granularity range is a granularity range less than the second granularity and greater than 0; the third crushing granularity range is a granularity range less than the second granularity and greater than or equal to a third granularity; the fourth crushing granularity range is a granularity range less than the third granularity and greater than 0; and the fifth crushing granularity range is a granularity range less than the fourth granularity and greater than or equal to the third granularity; where the first granularity is greater than the second granularity, the second granularity is greater than the third granularity, and the fourth granularity is greater than the third granularity.

Processing unit 304 is configured to conduct ore presorting on the ores to be processed based on the multi-hierarchy ore processing structure so as to acquire ores that meet a predetermined granularity.

Each processing hierarchy includes a granularity hierarchy and a sorting hierarchy. After the determining, according to the parameter information, the number of intelligent sorting devices and a sorting hierarchy structure of a plurality of intelligent sorting devices for hierarchical arrayed intelligent sorting, the method further includes:

- configuring each of the intelligent sorting devices, wherein a plurality of intelligent sorting devices in the same sorting hierarchy are configured to sort ores within the same crushing granularity range, and intelligent sorting devices in different sorting hierarchies are configured to sort ores within different crushing granularity ranges.

The configuring each of the intelligent sorting devices includes: determining a current sorting hierarchy of an intelligent sorting device to be configured; determining a current crushing granularity range corresponding to the current sorting hierarchy; determining, according to the current crushing granularity range, a selected spectral band of X-rays; and setting a spectral band of a radiation source of the intelligent sorting device to be configured as the selected spectral band. Through the above configuration, after the X-ray penetrates the ores within the current crushing granularity range, it still meets the needs of the detector to collect attenuation data information.

The configuring each of the intelligent sorting devices includes: determining a current sorting hierarchy of an intelligent sorting device to be configured; determining a current crushing granularity range corresponding to the current sorting hierarchy; determining, according to the current crushing granularity range, a target abrasive resistance of a carrier belt; and determining, according to the target abrasive resistance, the carrier belt with a selected thickness and a selected material for the intelligent sorting device to be configured. The above configuration can not only meet the service life of the belt in the sorting process of ores within the current crushing granularity range, but also avoid the waste caused by the high parameter value of the belt.

The configuring each of the intelligent sorting devices includes: determining a current sorting hierarchy of an intelligent sorting device to be configured; determining a current crushing granularity range corresponding to the current sorting hierarchy; determining, according to the current crushing granularity range, gas spraying parameters of the intelligent sorting device to be configured; and setting a blowing control unit of the intelligent sorting device to be configured according to the gas spraying parameters, wherein the blowing control unit controls a gas exhaust gun according to the gas spraying parameters, so that each nozzle of the gas exhaust gun is capable of spraying gas of predetermined pressure or strength; and the gas spraying parameters include a caliber size of the nozzle, airflow pressure and/or a time length of a single spray.

The intelligent sorting device is capable of sorting at least two different types of ores by using a gas exhaust gun, where the gas exhaust gun includes a plurality of nozzles, and each of the nozzles is capable of spraying gas at a predetermined time and with a predetermined pressure under the control of a blowing control unit.

The sorting at least two different types of ores by using a gas exhaust gun comprises: controlling, by the blowing control unit, airflow pressure of gas sprayed by the nozzles of the gas exhaust gun so that the sprayed gas exerts different striking forces on each of at least two different types of ores, and thus each type of ores are allowed to enter a corresponding feed bin.

The gas exhaust gun can be arranged in a variety of ways. According to the first arrangement way, the gas exhaust gun is located on one side of an ore path, and includes at least one row of nozzles, and different striking forces of the airflow sprayed by the nozzles can be acquired by controlling effective calibers of the nozzles, or by controlling the airflow pressure of the gas sprayed by the nozzles. In the above way, the movement tracks of the ores struck by gas are all on one side of an original predetermined track, and correspondingly, collection devices for collecting different ores are all arranged on one side of an original drop point. According to the second arrangement way, the gas exhaust gun is located on two sides of an ore path, and the gas exhaust gun on each of the two sides includes at least one row of nozzles so that the gas exhaust gun sprays gas from two different directions to strike at least two different types of ores. In the above way, the movement tracks of the ores struck by gas are on two sides of an original predetermined track, and correspondingly, collection devices for collecting different ores are all arranged on two sides of an original drop point.

Based on the disclosure and teaching of the specification, those skilled in the art to which the present disclosure belongs may further make changes and modifications to the above implementations. However, the present disclosure is not limited to the above specific implementations, and any obvious improvements, replacements or modifications made by those skilled in the art on the basis of the present disclosure should fall within the protection scope of the present disclosure. In addition, although some specific terms are used in the specification, these terms are for the convenience of description, and are not intended to impose any restriction on the present disclosure.

What is claimed is:

1. A method for conducting ore presorting based on hierarchical arrayed intelligent sorting, comprising:

- acquiring parameter information of ores to be processed, and determining, according to the parameter information, the number of intelligent sorting devices and a sorting hierarchy structure of a plurality of intelligent sorting devices for hierarchical arrayed intelligent sorting, wherein the sorting hierarchy structure comprises at least two sorting hierarchies, and each of the sorting hierarchies comprises at least one intelligent sorting device;
- determining, according to the sorting hierarchy structure of the plurality of intelligent sorting devices, a granularity hierarchy structure for conducting multi-hierarchy granularity processing on the ores to be processed, wherein the granularity hierarchy structure comprises at least two granularity hierarchies;
- associating each sorting hierarchy in the sorting hierarchy structure with a corresponding granularity hierarchy in the granularity hierarchy structure to form a multi-hierarchy ore processing structure comprising at least two processing hierarchies; and conducting ore presorting on the ores to be processed based on the multi-hierarchy ore processing structure so as to acquire ores that meet a predetermined granularity;

the sorting hierarchy structure of a plurality of intelligent sorting devices for hierarchical arrayed intelligent sorting comprises a first sorting hierarchy, a second sorting hierarchy and a third sorting hierarchy; and the granularity hierarchy structure comprises a first granularity hierarchy, a second granularity hierarchy and a third granularity hierarchy;

cyclically conducting primary crushing and primary sieving on the ores to be processed by using crushing processing of the first granularity hierarchy to acquire ores within a first crushing granularity range and ores within a second crushing granularity range; conducting sorting on the ores within the first crushing granularity range by using each intelligent sorting device in the first sorting hierarchy to acquire waste, primary concentrates and primary middlings; cyclically conducting secondary crushing and secondary sieving on the primary middlings and the ores within the second crushing granularity range by using crushing processing of the second granularity hierarchy to acquire ores within a third crushing granularity range and ores within a fourth crushing granularity range; conducting sorting on the ores within the third crushing granularity range by using each intelligent sorting device in the second sorting hierarchy to acquire waste, secondary concentrates and secondary middlings; cyclically conducting third crushing and third sieving on the secondary middlings by using crushing processing of the third granularity hierarchy to acquire ores within a fourth crushing granularity range and ores within a fifth crushing granularity range; conducting sorting on the ores within the fifth crushing granularity range by using each intelligent sorting device in the third sorting hierarchy to acquire waste and third concentrates; and the second sorting hierarchy and/or the third sorting hierarchy comprise/comprises a plurality of intelligent sorting devices connected in parallel.

2. The method according to claim 1, wherein the determining, according to the parameter information, the number of intelligent sorting devices and the sorting hierarchy structure of a plurality of intelligent sorting devices for hierarchical arrayed intelligent sorting comprises:

acquiring a configuration file associated with ore presorting, and determining a throughput of ore presorting according to the configuration file;

analyzing the parameter information to determine an initial waste ratio, an initial concentrate ratio and an initial average granularity of the ores to be processed; and determining, based on the throughput, the number of intelligent sorting devices, and determining, based on the initial waste ratio, the initial concentrate ratio and the initial average granularity of the ores to be processed, the sorting hierarchy structure of a plurality of intelligent sorting devices for hierarchical arrayed intelligent sorting.

3. The method according to claim 2, wherein the determining, based on the throughput, the number of intelligent sorting devices comprises:

determining an ore sorting amount per unit time for each intelligent sorting device; and determining, based on the ore sorting amount per unit time for each intelligent sorting device and the throughput, the number of intelligent sorting devices.

4. The method according to claim 2, wherein the determining, based on the initial waste ratio, the initial concentrate ratio and the initial average granularity of the ores to be processed, the sorting hierarchy structure of a plurality of intelligent sorting devices for hierarchical arrayed intelligent sorting comprises:

when the initial waste ratio of the ores to be processed is greater than or equal to a waste ratio threshold, the initial concentrate ratio is greater than or equal to a concentrate ratio threshold, or the initial average granularity is greater than or equal to an initial granularity threshold, determining the sorting hierarchy structure of a plurality of intelligent sorting devices for hierarchical arrayed intelligent sorting as follows: the number of intelligent sorting devices decreases gradually from a large granularity sorting grade to a small granularity sorting grade; and when the initial waste ratio of the ores to be processed is less than a waste ratio threshold, the initial concentrate ratio is less than a concentrate ratio threshold, or the initial average granularity is less than an initial granularity threshold, determining the sorting hierarchy structure of a plurality of intelligent sorting devices for hierarchical arrayed intelligent sorting as follows: at least one target sorting hierarchy is selected from a plurality of sorting hierarchies, and at least two intelligent sorting devices are parallelly deployed at each target sorting hierarchy.

5. The method according to claim 1, wherein the intelligent sorting device is capable of feeding ores of a predetermined granularity to a high speed belt of a conveying sub-device by using a feeding sub-device;

after conveying the ores of a predetermined granularity for a predetermined distance, the high speed belt of the conveying sub-device enters a steady state, and the ores of a predetermined granularity are conveyed to a sensing sub-device;

when the ores of a predetermined granularity pass directly below a radiation source of the sensing sub-device under the conveying of the belt, the X-ray source irradiates the ores of a predetermined granularity using X-rays excited by high voltage, and X-rays penetrating the ores of a predetermined granularity are attenuated to different degrees depending on different contents of measured elements;

a detector of the sensing sub-device located under the belt collects attenuation data information, converts the attenuation data information into a photoelectric digital signal, and transmits the photoelectric digital signal to an intelligent recognition sub-device of an intelligent recognition system;

the intelligent recognition sub-device generates an image to be recognized based on the photoelectric digital signal, conducts content recognition on the image to be recognized to determine ore parameters of the ores of a predetermined granularity, determines current sorting parameters based on a current grade threshold, compares the ore parameters with the current sorting parameters, marks the ores of a predetermined granularity as waste, concentrates or middlings based on a comparison result, and transmits location information of the ores marked as waste, concentrates or middlings to a blowing control unit of a separation sub-device; and when the ores of a predetermined granularity reach a predetermined position under the belt conveying of the conveying sub-device, a gas exhaust gun of the separation sub-device is controlled by the blowing control unit to blow the ores marked as waste, concentrates or middlings ore via a nozzle of the gas exhaust gun, so as to sort the waste, concentrates and middlings, and thus realize the sorting of the ores of a predetermined granularity.

6. The method according to claim 1, wherein each granularity hierarchy comprises: crushing processing and sieving processing, and according to a processing order from ores of a maximum granularity to ores of a minimum granularity during multi-hierarchy granularity processing, the granularity of ores acquired at each of the plurality of granularity hierarchies decreases in turn.

7. The method according to claim 1, wherein each granularity hierarchy comprises conducting crushing processing on input ores, and conducting sieving processing on ores acquired after crushing processing; and transferring ores capable of passing sieving processing to a connected intelligent sorting device or to the next granularity hierarchy; continuing to conduct crushing processing on ores that fail to pass sieving processing until the ores are capable of passing sieving processing.

8. The method according to claim 1, wherein the first crushing granularity range is a granularity range less than or equal to a first granularity and greater than or equal to a second granularity;

the second crushing granularity range is a granularity range less than the second granularity and greater than 0;

the third crushing granularity range is a granularity range less than the second granularity and greater than or equal to a third granularity;

the fourth crushing granularity range is a granularity range less than the third granularity and greater than 0; and the fifth crushing granularity range is a granularity range less than the fourth granularity and greater than or equal to the third granularity; wherein the first granularity is greater than the second granularity, the second granularity is greater than the third granularity, and the fourth granularity is greater than the third granularity.

9. The method according to claim 1, wherein each processing hierarchy comprises a granularity hierarchy and a sorting hierarchy.

10. The method according to claim 1, wherein after determining, according to the parameter information, the number of intelligent sorting devices and a sorting hierarchy structure of a plurality of intelligent sorting devices for hierarchical arrayed intelligent sorting, the method further comprises: configuring each of the intelligent sorting devices, wherein a plurality of intelligent sorting devices in the same sorting hierarchy are configured to sort ores within the same crushing granularity range, and intelligent sorting devices in different sorting hierarchies are configured to sort ores within different crushing granularity ranges.

11. The method according to claim 10, wherein the configuring each of the intelligent sorting devices comprises:

determining a current sorting hierarchy of an intelligent sorting device to be configured;

determining a current crushing granularity range corresponding to the current sorting hierarchy;

determining, according to the current crushing granularity range, a selected spectral band of X-rays; and setting a spectral band of a radiation source of the intelligent sorting device to be configured as the selected spectral band.

12. The method according to claim 10, wherein the configuring each of the intelligent sorting devices comprises:

determining a current sorting hierarchy of an intelligent sorting device to be configured;

determining a current crushing granularity range corresponding to the current sorting hierarchy;

determining, according to the current crushing granularity range, a target abrasive resistance of a carrier belt; and determining, according to the target abrasive resistance, the carrier belt with a selected thickness and a selected material for the intelligent sorting device to be configured.

13. The method according to claim 10, wherein the configuring each of the intelligent sorting devices comprises:

determining a current sorting hierarchy of an intelligent sorting device to be configured;

determining a current crushing granularity range corresponding to the current sorting hierarchy;

determining, according to the current crushing granularity range, gas spraying parameters of the intelligent sorting device to be configured; and setting a blowing control unit of the intelligent sorting device to be configured according to the gas spraying parameters, wherein the blowing control unit controls a gas exhaust gun according to the gas spraying parameters, so that each nozzle of the gas exhaust gun is capable of spraying gas of predetermined pressure or strength; and the gas spraying parameters comprise a caliber size of the nozzle, airflow pressure and/or a time length of a single spray.

14. The method according to claim 13, wherein the gas exhaust gun is located on one side of an ore path, and comprises at least one row of nozzles, and different striking forces of the airflow sprayed by the nozzles can be acquired by controlling effective calibers of the nozzles, or by controlling the airflow pressure of the gas sprayed by the nozzles.

15. The method according to claim 13, wherein the gas exhaust gun is located on two sides of an ore path, and the gas exhaust gun on each of the two sides comprises at least one row of nozzles so that the gas exhaust gun sprays gas from two different directions to strike at least two different types of ores.

16. The method according to claim 1, wherein the intelligent sorting device is capable of sorting at least two different types of ores by using a gas exhaust gun, wherein the gas exhaust gun comprises a plurality of nozzles, and each of the nozzles is capable of spraying gas at a predetermined time and with a predetermined pressure under the control of a blowing control unit.

17. The method according to claim 16, wherein the sorting at least two different types of ores by using a gas exhaust gun comprises: controlling, by the blowing control unit, airflow pressure of gas sprayed by the nozzles of the gas exhaust gun so that the sprayed gas exerts different striking forces on each of at least two different types of ores, and thus each type of ores are allowed to enter a corresponding feed bin.

* * * * *